(12) United States Patent
Carr

(10) Patent No.: US 8,717,580 B2
(45) Date of Patent: May 6, 2014

(54) MULTI-BEAM OPTICAL DISPLACEMENT SENSOR

(75) Inventor: Dustin W. Carr, Albuquerque, NM (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/553,298

(22) Filed: Jul. 19, 2012

(65) Prior Publication Data

US 2014/0022557 A1    Jan. 23, 2014

(51) Int. Cl.
    *G01B 11/14*    (2006.01)
(52) U.S. Cl.
    USPC .......................................................... 356/614
(58) Field of Classification Search
    USPC .......................................................... 356/614
    See application file for complete search history.

(56) References Cited

U.S. PATENT DOCUMENTS

| | | |
|---|---|---|
| 4,815,855 A | 3/1989 | Dixon |
| 4,983,824 A | 1/1991 | Saaski et al. |
| 6,563,593 B2 | 5/2003 | Hill |
| 6,884,981 B2 | 4/2005 | Proksch et al. |
| 7,355,723 B2 | 4/2008 | Carr et al. |
| 7,362,422 B2 | 4/2008 | DiFoggio et al. |
| 7,495,775 B2 | 2/2009 | Carr |
| 7,554,674 B2 | 6/2009 | Carr |
| 7,583,390 B2 | 9/2009 | Carr |
| 7,626,707 B2 | 12/2009 | Carr |
| 7,751,064 B2 | 7/2010 | Liesener et al. |
| 7,894,618 B2 | 2/2011 | Carr |
| 8,007,609 B2 | 8/2011 | Carr et al. |
| 2009/0051938 A1* | 2/2009 | Miousset et al. ............. 356/625 |
| 2009/0268211 A1 | 10/2009 | Carr et al. |
| 2010/0025112 A1 | 2/2010 | Sroka et al. |
| 2012/0099114 A1 | 4/2012 | Carr et al. |

* cited by examiner

*Primary Examiner* — Tu Nguyen
(74) *Attorney, Agent, or Firm* — Mossman Kumar & Tyler PC

(57) ABSTRACT

An apparatus and method for estimating a parameter of interest using values of a beam property from two or more electromagnetic beams that both converge in an optical displacement device. The apparatus may include a Fabry-Perot interferometer, a light source, and a detection array. The electromagnetic beams may be converged one or more of: the interferometer and a convergence device. At least one reflective surface of the interferometer may be operably coupled to an element receiving an external stimulus, such as pressure, force, and/or acceleration. The method includes using the apparatus.

22 Claims, 8 Drawing Sheets

MULTI-BEAM OPTICAL DISPLACEMENT SENSOR

BACKGROUND OF THE DISCLOSURE

1. Field of the Disclosure

In one aspect, this disclosure generally relates methods and apparatuses for sensing displacement optically.

2. Background of the Art

Displacement sensors, such as microphones and pressure sensors, are well-known. Many displacement sensors may be based on one or more of electrical capacitance, electrical impedance, or magnetic fields. These electrical and magnetic based displacement sensors may be limited due to one or more of: low sensitivity, the need for high-voltage biasing, poor electrical isolation, environmental factors, and response nonlinearities. These limitations may require a close coupling between transducer design and the sensor mechanical design, which may limit performance and the operational size of the displacement sensor. Optical displacement sensors may be electrically and magnetically insensitive, which may mitigate limitations found in electrical and magnetic based displacement sensors. The present disclosure uses optical displacement to address the need to minimize the impact of these limitations on the performance or structure of devices.

SUMMARY OF THE DISCLOSURE

In aspects, the present disclosure is related to an apparatus and method for estimating a parameter of interest using values of a beam property from two or more electromagnetic beams that both pass through at least part of an optical displacement device.

One embodiment according to the present disclosure includes an apparatus for estimating a parameter of interest, comprising: an optical displacement device configured to receive a first electromagnetic beam with a first value of a beam property and a second electromagnetic beam with a second value of the beam property; and a detector array configured to receive a part of the first electromagnetic beam and a part of the second electromagnetic beam, where the first electromagnetic beam and the second electromagnetic beam form a convergence within the optical displacement device.

Another embodiment according to the present disclosure includes a method for estimating a parameter of interest, comprising: estimating the parameter of interest using a detector array configured to receive a part of a first electromagnetic beam and a part of a second electromagnetic beam, wherein each of the electromagnetic beams has a value of a beam property and the electromagnetic beams converge in an optical displacement device prior to reaching the detector array.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Figure 1:
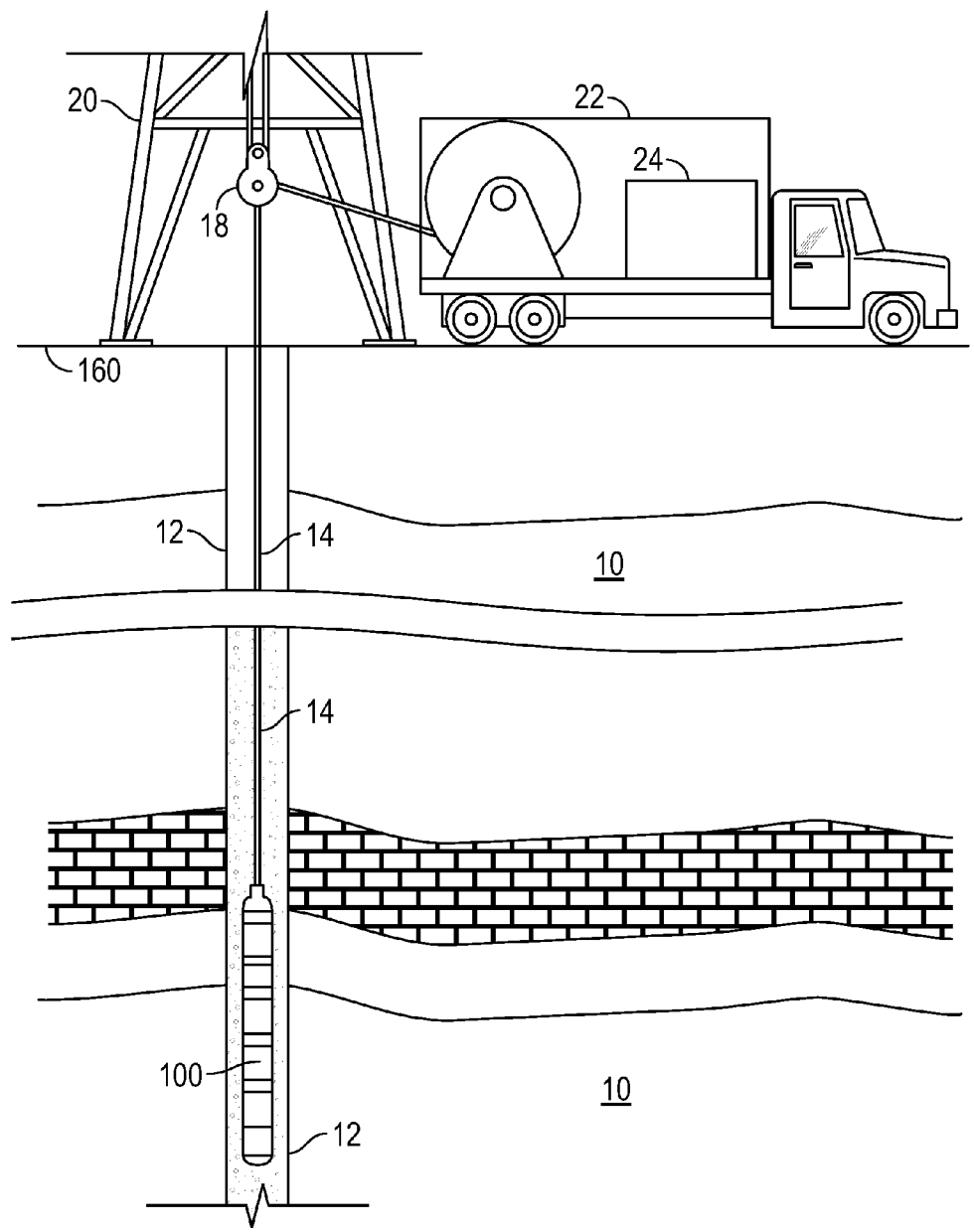
FIG. 1 shows an optical displacement device deployed along a wireline according to one embodiment of the present disclosure.

The present disclosure relates to devices and methods for estimating a parameter of interest using values of a beam property from two or more electromagnetic beams that both pass through at least part of an optical displacement device. The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

FIG. 1 shows one embodiment according to the present disclosure wherein a cross-section of a subterranean formation 10 in which is drilled a borehole 12 is schematically represented. Suspended within the borehole 12 at the bottom end of a carrier such as a wireline 14 is a device or tool 100. The term "carrier" as used herein means any device, device component, combination of devices, media and/or member that may be used to convey, house, support, or otherwise facilitate the use of another device, device component, combination of devices, media and/or member. Exemplary non-limiting carriers include drill strings of the coiled tube type, of the jointed pipe type, and any combination or portion thereof. Other carrier examples include casing pipes, wirelines, wireline sondes, slickline sondes, drop shots, downhole subs, bottom hole assemblies, drill string inserts, modules, internal housings, and substrate portions thereof. The tool 100 may include an information processing device. Information processing device as used herein means any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals. The wireline 14 may be carried over a pulley 18 supported by a derrick 20. Wireline deployment and retrieval is performed by a powered winch carried by a service truck 22, for example. A control panel 24 interconnected to the tool 100 through the wireline 14 by conventional means controls transmission of electrical power, data/command signals, and also provides control over operation of the components in the device 100. Use of a non-rigid carrier to convey tool 100 is exemplary only. Tool 100 may also be conveyed by a rigid carrier. In some embodiments, the borehole 12 may be utilized to recover hydrocarbons. In other embodiments, the borehole 12 may be used for geothermal applications, water production, mining, tunnel construction, or other uses.

In embodiments, the device 100 may be configured to collect information regarding force or acceleration. The device may also be configured to: (i) actively or passively collect information about the various characteristics of the formation, (ii) provide information about tool orientation and direction of movement, (iii) provide information about the characteristics of the reservoir fluid, and/or (iv) evaluate reservoir conditions (e.g., formation pressure, wellbore pressure, temperature, etc.). Exemplary devices may include resistivity sensors (for determining the formation resistivity, dielectric constant and the presence or absence of hydrocarbons), acoustic sensors (for determining the acoustic porosity of the formation and the bed boundary in the formation), nuclear sensors (for determining the formation density, nuclear porosity and certain rock characteristics), nuclear magnetic resonance sensors (for determining the porosity and other petrophysical characteristics of the formation), and gravimeters/gravity gradiometers (for estimating formation density). Other exemplary devices may include gyroscopes, magnetometers, accelerometers, and sensors that collect formation fluid samples and determine the properties of the formation fluid, which include physical properties and chemical properties.

Device 100 may be conveyed to a position in operable communication or proximity with a parameter of interest. In some embodiments, device 100 may be conveyed into a borehole 12. The parameter of interest may include, but is not limited to, one of: (i) pressure, (ii) force, and (iii) acceleration. Depending on the operating principle of the device 100, the device 100 may be configured to operate under surface and borehole conditions. The ambient temperature in the borehole may exceed 120 degrees Celsius (248 degrees Fahrenheit). In other embodiments, a device 100 may be used at the surface 160.

Device 100 may include an optical displacement sensor. Optical-displacement sensors operate by detecting light reflected by an optical element that changes its reflectivity in response to an environmental stimulus, such as pressure differential, sound, vibration, etc. The detected light may be converted into an electrical signal. This signal may be a function of the reflectivity of the optical element, and, therefore, a function of the stimulus as well. Optical displacement sensor may include an optical interferometer.

Optical interferometers have been proven to have outstanding resolution when used as displacement detectors in physical sensing components, such as microphones, pressure sensors, and accelerometers. One exemplary optical interferometer is the Fabry-Perot interferometer, which is also known as an etalon. An etalon may include an optically resonant cavity that distributes optical energy of an input light signal into a reflected signal and a transmitted signal. The ratio of optical energy in the reflected and transmitted signals may depend on the cavity length of the optically resonant cavity, which is the spacing between its two, substantially-parallel, partially reflective surfaces and its operating wavelength, x, (i.e., the wavelength, x, of the light on which the interferometer operates).

In an etalon, light can be strongly modulated by very small changes in the cavity length, and these changes can be detected using standard optical detection approaches that result in a wide dynamic range. The use of light beam for the readout is very different from the more standard approaches that use charged particles, including electrostatic, capacitive, piezoelectric, or piezoresistive techniques. All of these technologies require a close coupling between the transducer design and the sensor mechanical design. This results in constraints on the sensor that affect the performance adversely, especially as the size is reduced. An etalon-based displacement sensor having high dynamic range and high sensitivity may have many advantages in the field of physical sensing including reduction in size of the optical interferometer transducer and not adversely interacting with the optical interference transducer. This independence between the etalon and the optical interference transducer may result in the benefit of a decoupling of the transducer and the sensor design.

An etalon may be configured to be sensitive to a force or acceleration stimulus by having one surface of the etalon operably coupled to a surface of, or disposed on, a movable element. When the element moves in response to the stimulus, the cavity length changes and, therefore, so does the ratio of optical energy in the reflected and transmitted signals. As a result, an electrical output signal based on one of the reflected and transmitted signals may be a function of the stimulus incident on the etalon.

The basic operating principal involves the creation of an optical path whose length is varied when subjected to an external stimulus, such as pressure or acceleration. An etalon may be used for consideration of the design issues in these types of transducers in general. This type of interferometer may have two parallel dielectric mirrors that bound an empty cavity. Light that is incident upon the cavity will be partially transmitted according to the formula:

$$T = \frac{1}{\left(1 + F \sin^2 \frac{\varphi}{2}\right)^2}. \tag{1}$$

wherein F (finesse) is determined by the reflectance of the two mirrors, $$F = \frac{4R_0}{(1 - R_0)^2}. \tag{2}$$

wherein $R_0$ is the reflectance of the mirrors. Herein, it is assumed that the reflectance values of the two minors are equal. $\varphi = 4\pi n d \cos \theta / \lambda$, is the optical phase that is picked up in a wave with wavelength $\lambda$ as it makes a roundtrip within the cavity of length d and index of refraction n with angle of incidence $\theta$.

Under some conditions, where one surface of the etalon is operably connected to a movable element, it is possible for the two surfaces of the etalon to be positioned, at least temporarily, in non-parallel positions, such as due to tilting or other non-parallel relative movement. If one of the two surfaces is tilted relative to the other, then the surfaces will no longer be parallel to one another and, thus, not substantially equidistant. Since the two surfaces are no longer substantially equidistant at all points where the light beams pass through the etalon, there may be errors introduced due to the tilt. These errors may be reduced by focusing the optical paths of the light beams to converge within the etalon. The convergence may be located in the optically resonant cavity (i.e. gap) and/or the etalon materials that form the gap. The convergence of the light beams may be achieved using a convergence device that is configured to converge the optical paths of the light beams, such as a lens or a mirror.

Figure 2:
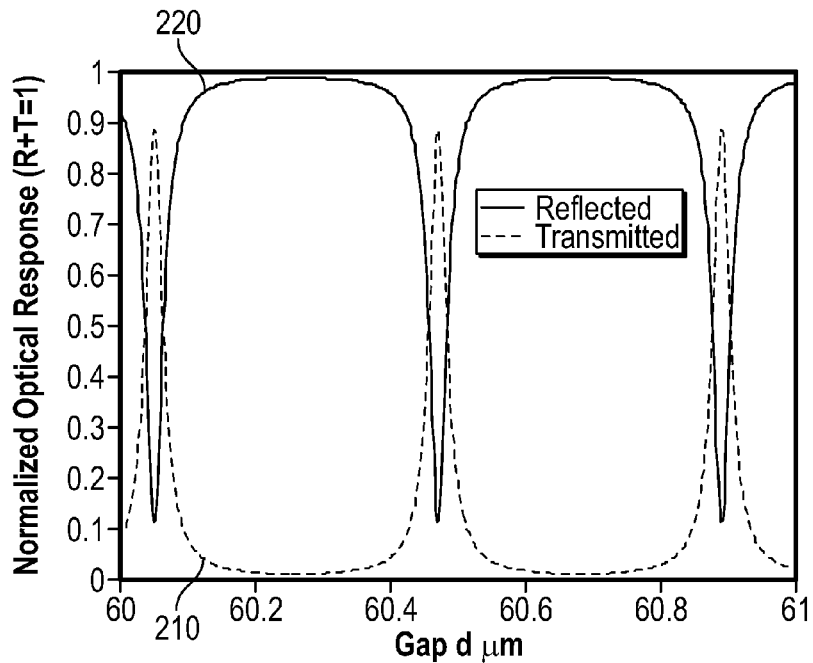
FIG. 2 shows a graph of reflected and transmitted light in a Fabry-Perot interferometer according to the present disclosure.

A typical response is shown in FIG. 2, where a transmitted wave 210 is reflected as reflected wave 220. The rate of change of the optical signal may be on the order of several percent per nanometer of motion. The optical signal can be resolved at a level below 100 parts per billion (ppb), which translates to the ability of the transducer to detect femtometer-scale changes in the displacement of one mirror relative to the other mirror. However, the sensitivity of the transducer may be very low throughout most of the typical operating points as can be seen in curves 210 and 220. Sensitivity of the transducer may be proportional to the absolute value of the slope of curves 210 and 220. So it may be observed that the slope, and sensitivity, may be very low when the gap d is between about 60.2 micrometers and 60.4 micrometers, and the slope may observed to be higher between about 60.4 micrometers and 60.6 micrometers.

A high resolution sensor, may require that the optical cavity length be allowed to vary over many wavelengths. One way to maintain sensitivity over a wide range of cavity lengths is to use multiple beams of light where each beam has a different response to changes in cavity length. The multiple beams of light may exhibit different responses by having different wavelengths, different angles of incidence, or a combination thereof.

Figure 3:
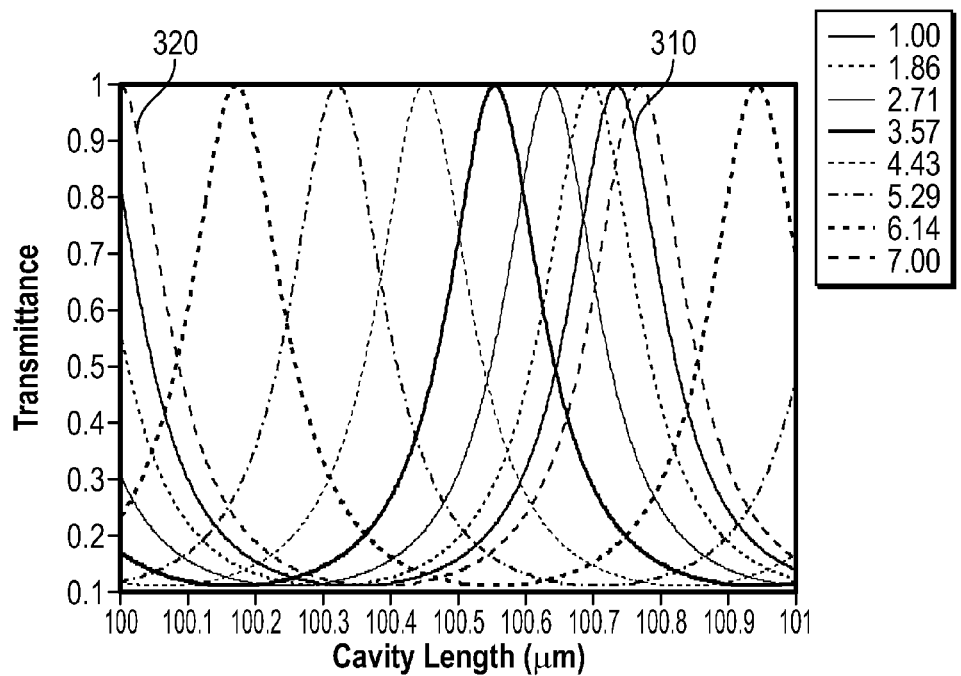
FIG. 3 shows a graph of optical responses to a range of incident angles of light in the Fabry-Perot interferometer according to the present disclosure.

FIG. 3 shows a chart of curves representing multiple beams on light using an exemplary set of different angles of incidence. The angles of incidence in this example range from 1.00 degrees in curve 310 to 7.00 degrees in curve 320. This range of angles is exemplary and illustrative only, and other ranges of angles may be used as would be understood by one of skill in the art with the benefit of the present disclosure. It may be seen from these curves that more than one beam may be sensitive to a particular cavity length. These beams may be produced using techniques known to those of skill in the art, including, but not limited to, one or more of: (i) directing multiple light beams toward a single lens configured to operate in a pupil division mode and (ii) directing multiple light beams toward an individual lenslets corresponding to each of the multiple light beams.

Figure 4:
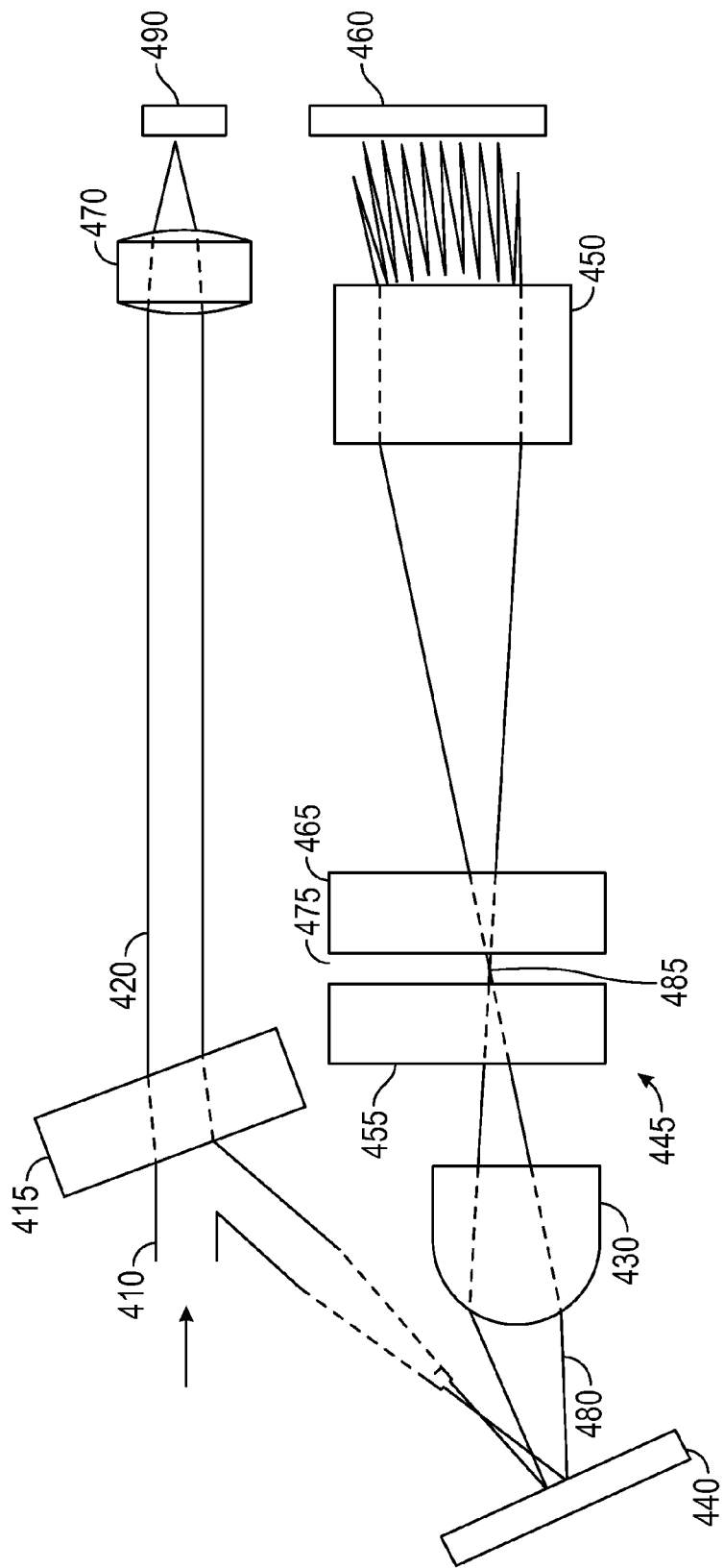
FIG. 4 shows a schematic of an optical displacement apparatus according to one embodiment of the present disclosure.

FIG. 4 shows a schematic of one embodiment according to the present disclosure. The coherent light beam 410 may be split by a beam splitter 415 to generate a reference signal 420 and beams 480. In some embodiments, coherent light beam 410 may be collimated and/or polarized. Beams 480 may be reflected by an input tilt mirror 440. While the input tilt minor 440 is shown as a flat reflective surface, this is illustrative and exemplary only, as the input tilt mirror 440 may have other shapes as understood by one of skill in the art, such as concave. Beams 480 may diverge as the beams travel, and, in some embodiments, the divergence of beams 480 may be increased using an optional lens (not shown), such as a cylindrical condenser lens. The mean angle of incidence of the beams 480 through the etalon 445 may be set by input tilt mirror 440 and convergence device 430. The beams 480 may enter convergence device 430 on-axis and/or off-axis relative to the axis of convergence device 430. In some embodiments, the mean angle may range from about 0 degrees to about $\theta_{max}$ degrees, where:

$$\theta_{max} < \frac{w}{2d_{max}k_0}; \quad (3)$$

w=width of beam;

$k_0 = 100R(2+R)(1-R^2)^{-1}$; and

R=Reflectivity of etalon surfaces

It may be understood by one of skill in the art with the benefit of the present disclosure that the mean angle may range from about 0 degrees to an angle of such magnitude as causes the light beam to degrade such that the light beam may no longer interfere with itself. The light beams 480 may be converged in an etalon 445 by the convergence device 430. The convergence device 430 may be configured to focus the beams 480 to a convergence 485 within the etalon 445. The convergence device 430 may include, but is not limited to, one or more of: a convex lens, a cylindrical condenser lens, and a concave mirror.

The etalon 445 may include an optically resonant cavity 475 formed between a first element 455 and a second element 465. The first and second elements 455, 465 may include facing reflective surfaces and be configured to allow passage of at least part of light beams 480. The optically resonant cavity 475 may include a vacuum, filled with air, filled with liquid, or filled with a non-rigid solid. In some embodiments, the optically resonant cavity 475 may include a material with the same refractive index as the first and second element 455, 465, so long as the elements 455, 465 have reflective facing surfaces. The elements 455, 465 may be configured to move relative to one another. In some embodiments, the material in the gap 475 and the elements 455, 465 may be identical, so long as the elements 455, 465 have reflective facing surfaces. In some embodiments, at least one of the elements 455, 465 may be operably coupled to a moveable element (not shown).

The beams 480 passing through etalon 445 may converge within the etalon. In some embodiments, the convergence 485 (also known as a "beam waist") may be located in one or more of: the optically resonant cavity 475, a first etalon element 455 and second etalon element 465. After converging in the etalon 445, the light beams 480 may continue to pass through the etalon. The size of the convergence 485 may depend on various factors, including but not limited to, properties of the light beams 480, manufacturing tolerances of etalon 445, and quality of the convergence device 485.

The light beams 480, each with its own angle of incidence, may be partially transmitted through the etalon 445 and may be collimated before reaching a detector array 460 by a collimator lens 450. The number of angles of the light beams may vary with the finesse of the etalon 445. Finesse is a parameter characterizing an optical cavity and may be a function of the reflectivity of the mirrored surfaces of the etalon 445, herein defined by eqn. (2). Generally, a higher reflectivity may result in a higher degree of finesse and the higher the number of angles of the light beams that may be required in the etalon 445. The detector array 460 may include two or more light sensitive detectors, such as photodiodes. In this exemplary embodiment, the detector array 460 includes nine (9) detectors with a spot size of each detector at about 10 micrometers and an array spacing of about 575 micrometers. Detector array 460 may distribute the detectors linearly. Detector array 460 may include at least one detector for each of the light beams 480. The detector array 460 may be configured to generate electrical signals in response to receiving energy from the light beams 480. The collimator lens 450 may include a lens array with a plurality of lenses. Condenser lens 470 may focus light beam 410 on a reference detector 490. The light beam 410 may be of any wavelength (infra-red, visible, ultraviolet, etc.) as long as the corresponding lenses, detectors, and etalon are configured and/or selected to properly respond to the wavelength used. In some embodiments, a second light beam (not shown) at a different wavelength from light beam 410 may be used along with light beam 410.

Figure 5:
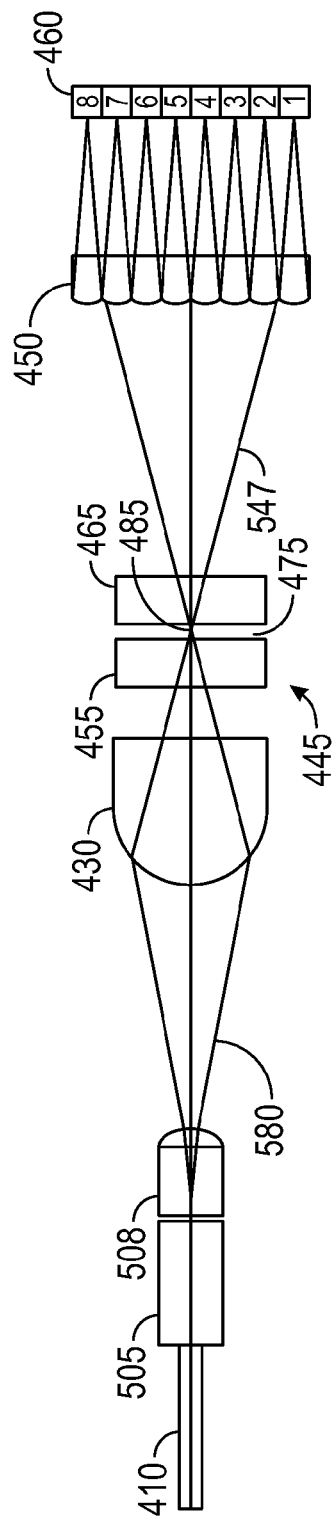
FIG. 5 shows a schematic of the divergent light beams produced in another optical displacement apparatus according to one embodiment of the present disclosure.

FIG. 5 shows a schematic of another embodiment according to the present disclosure. Here, coherent light beam 410 passes though a collimator lens 505 and polarizer 508 to form beams 580. Beams 580 may pass through convergence device 430. In some embodiments, an optional lens (not shown) may be disposed between polarizer 508 and convergence device 430 and may be configured to cause beam 580 to diverge or converge. The optional lens may include one or more of: (i) a pair of concave lenses, (ii) a single concave lens, (iii) a pair of convex lenses, and (iv) a single convex lens. Beams 580 may be divergent or convergent when exiting polarizer 508. The beams 580 may enter an etalon 445 and converge at a convergence 485 in at least one of: optically resonant cavity 475, the first etalon element 455, and the second etalon element 465. Part of each of the beams 547 that has passed through etalon 445 is transmitted to a lens array 450. The lens array 450 focuses the beams on a detector array 460. In some embodiments, a single lens (not shown) may be used in addition to or instead of the lens array 450. In some embodiments, an optical grating (not shown) may be used in addition to or instead of lens array 450. The detector array 460 may be configured to generate electrical signals in response to receiving energy from the light beams 580. While there is no reference beam shown, a reference beam may be added to increase sensitivity for some applications. The reference beam may be used to cancel noise caused by intensity variations of the incoming light beam 410. The use of an optional reference beam may be determined by expertise of those of skill in the art.

Figure 6:
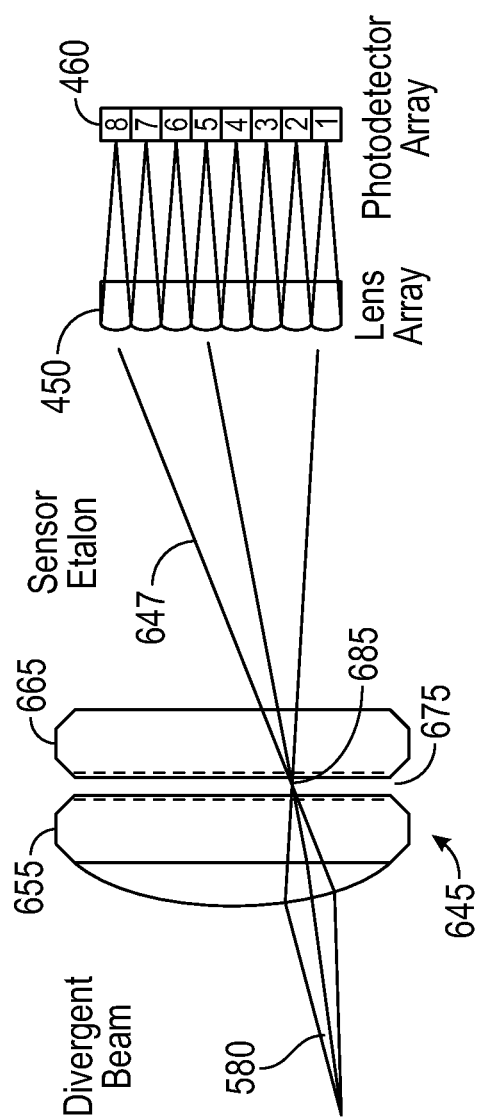
FIG. 6 shows a schematic of the interferometer and detection array of an optical displacement apparatus according to one embodiment of the present disclosure.

FIG. 6 shows a schematic of another embodiment according to the present disclosure. Here, light beams 580 may be converged in the etalon 645 by a first element 655 of etalon 645. The etalon 645 may include a first element 655, a second element 665, and an optically resonant cavity 675, where the first and second elements 655, 665 include facing, reflective surfaces. The first element 655 may be configured to cause the optical paths of beams 580 to converge and form convergence 685 in etalon 645. The first element may include a convex lens. The beams 580 exiting the etalon 645 as beams 647 may then be focused by lens array 450 on a detector array 460. In some embodiments, a single lens (not shown) may be used in addition to or instead of the lens array 450. In some embodiments, an optical grating (not shown) may be used in addition to or instead of lens array 450. The detector array 460 may be configured to generate electrical signals in response to receiving energy from the light beams 580. While there is no reference beam shown, a reference beam may be added to increase sensitivity for some applications. The reference beam may be used to cancel noise caused by intensity variations of the incoming light beam 410. The use of an optional reference beam may be determined by expertise of those of skill in the art.

Figure 7:
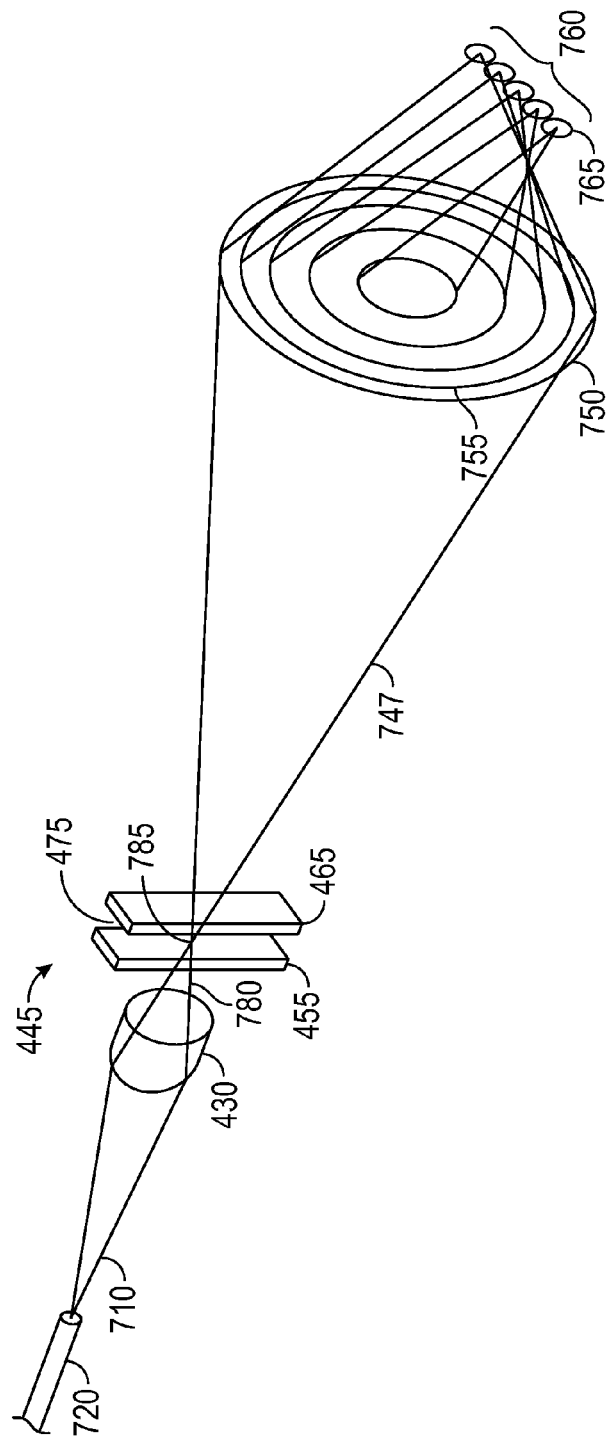
FIG. 7 shows a schematic of another optical displacement apparatus according to one embodiment of the present disclosure.

FIG. 7 shows a schematic of another embodiment according to the present disclosure. Here, coherent light beam 710 from a fiber optic source 720 naturally spreads as divergent beams. The beams 710 may be converged by passing through convergence device 430. The convergent beams 780 may pass through an etalon 445 to convergence 785. The convergence device 430 may be configured to form a convergence 785 of the optical paths of the convergent beams 780 to occur within etalon 445. Convergence 785 may be located in one or more of optically resonant cavity 475, first etalon element 455 and second etalon element 465. After the convergence 785, the beams 780 may become divergent beams 747 that exit the etalon 445 to a custom lens 750. The custom lens 750 may include off-axis Fresnel zones 755 that may transfer the incident energy of the light beam from each ring-shaped zone 755 and direct it to an individual detector 765 in a detector array 760. The detector array 760 may include at least two detectors responsive to electromagnetic energy. The detector array 760 may be configured to generate electrical signals in response to receiving energy from the light beams 747. The detector array 760 may include a plurality of detectors forming a linear array. An optional cylindrical lens (not shown) may be added between the fiber optic source 720 and the etalon 445 to collimate the divergent beams 780 along one axis.

Figure 8:
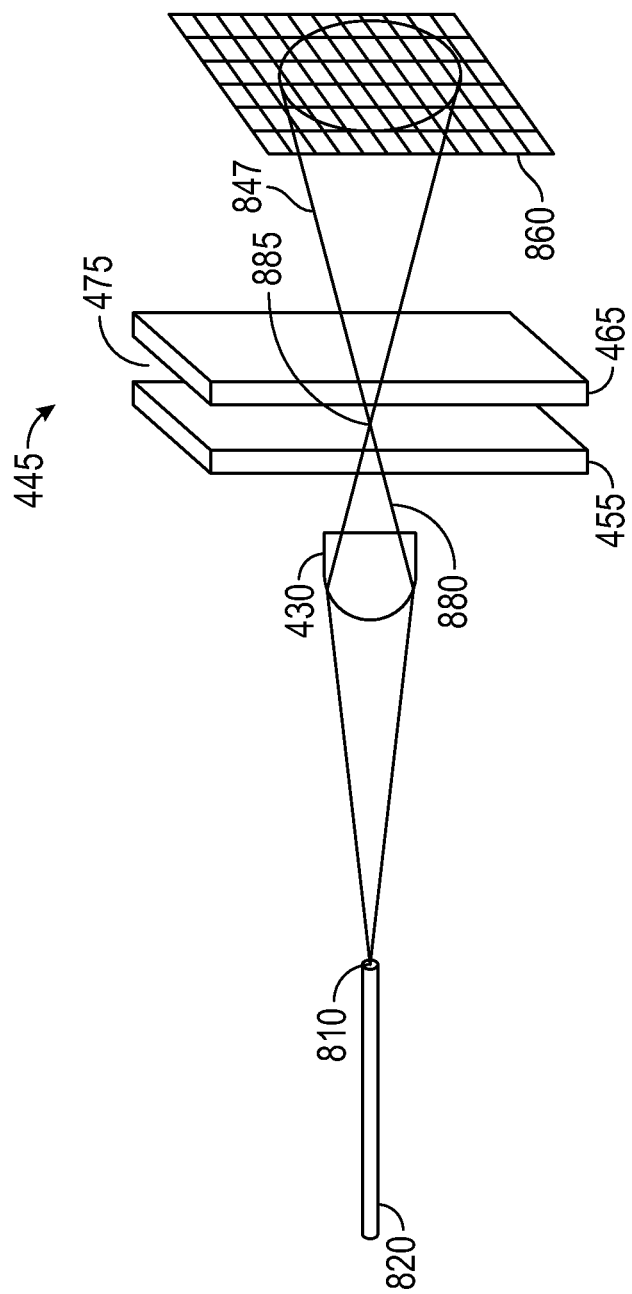
FIG. 8 shows a schematic of another optical displacement apparatus according to one embodiment of the present disclosure.

FIG. 8 shows a schematic of another embodiment according to the present disclosure. In this design, the natural diffraction from an exemplary fiber-optic source 820 may cause coherent light beam 810 to diverge over a range of angles of approximately +/−6 degrees. The use of diverting light beams is exemplary and illustrative only, as the light beams may be diverging, converging, parallel, or combinations thereof. This range of angles is exemplary and illustrative only, as other ranges of angles may be formed by a fiber-optic source as would be employed by one of skill in the art with the benefit of the present disclosure. The beams 810 may be converged by passing through convergence device 430. Optical device 430 may change beams 810 into convergent beams 880. The convergent beams 880 may converge at convergence 885 in etalon 445. Convergence 885 may be located in one or more of optically resonant cavity 475, first etalon element 455 and second etalon element 465. After the convergent beams 880 pass through the etalon 445, the now diverging beams 847 may be detected on a two-dimensional detector array 860. The detector array 860 may be configured to generate electrical signals in response to receiving energy from the light beams 847. The two-dimensional detector array 860 may include a charge coupled device (CCD) such as the type used in digital cameras. In some embodiments, an optional collimating lens (not shown) may be positioned between etalon 445 and detector array 860 to collimate the light beams 847.

Figure 9:
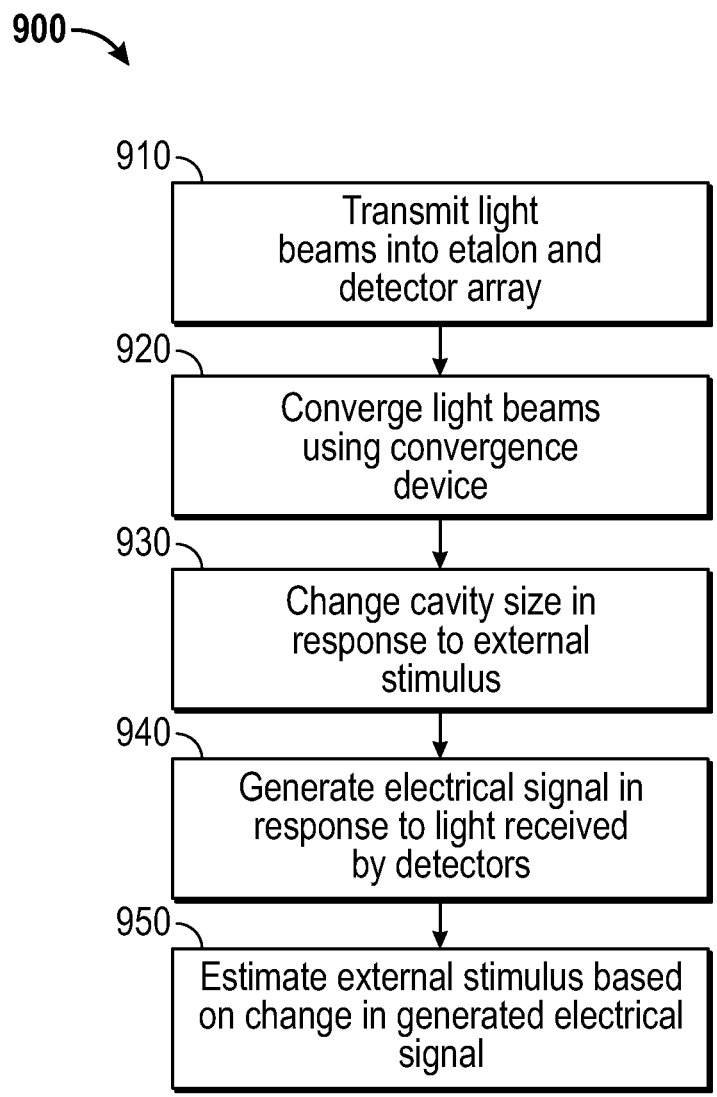
FIG. 9 shows a flow chart of a method of using an optical displacement apparatus according to one embodiment of the present disclosure.

FIG. 9 shows of flow chart of a method 900 according to one embodiment of the present disclosure. The method 900 may include using device 100. In step 910, a plurality of light beams 810 may be transmitted into convergence device 430. Light beams 810 may one of: converging, diverging, parallel, and combinations thereof. In step 920, convergence device 430 may change the optical paths of light beams 810 into convergent beams 880 that are transmitted into an etalon 445 and partially transmitted from the etalon 445 to a detector array 860. Convergent beams 880 have optical paths that form a convergence 885 within etalon 445. Each of the plurality of convergent light beams 847 may enter the etalon 445 with different angles of incidence. The light beams 880 may have the same wavelength, different wavelengths, or a combination thereof. In step 930, an external stimulus (such as force or acceleration) causes a displacement in one of the mirrored surfaces of elements 455, 465 of the etalon 445, which changes the cavity length of the optically resonant cavity 475 of the etalon 445. In step 940, electrical signals generated by the detector array 860 due to the partially transmitted light beams may be altered as a result of change in cavity length of the etalon 445. In step 950, an external stimulus may be estimated based on the change in the electrical signals generated by the detector array 860.

In some embodiments, the external stimulus estimation may also use a reference signal generated by a reference detector. In some embodiments, step 910 may be performed with a single light beam that is moved through a range of angles of incidence over a period of time, such that the electrical signals generated in step 940 may be produced sequentially. In some embodiments, the device 100 may be located at the surface 160. In some embodiments, device 100 may be conveyed in borehole 12 prior to step 910. In some embodiments, light beams that are diverging, converging, parallel, or combinations thereof may be used as light beams 810 in step 910, so long as convergent light beams 880 are focused to form convergence 885 within at least one part of etalon 445. In some embodiments, step 920 may be performed by an etalon 645 that includes a first element 655 that acts as a convergence device.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

While the foregoing disclosure is directed to the one mode embodiments of the disclosure, various modifications will be apparent to those skilled in the art. It is intended that all variations within the scope of the appended claims be embraced by the foregoing disclosure.

What is claimed is:

1. An apparatus for estimating a parameter of interest, comprising:
   an optical displacement device configured to receive a first electromagnetic beam with a first value of a beam property and a second electromagnetic beam with a second value of the beam property, wherein the first value is different than the second value; and
   a detector array configured to receive a part of the first electromagnetic beam and a part of the second electromagnetic beam, where the first electromagnetic beam and the second electromagnetic beam form a convergence within the optical displacement device.

2. The apparatus of claim 1, further comprising:
   a convergence device configured to converge the first and second electromagnetic beams in the optical displacement device.

3. The apparatus of claim 2, wherein the convergence device comprises at least one of: (i) a lens and (ii) a mirror.

4. The apparatus of claim 2, wherein the convergence device is one of: (i) part of the optical displacement device and (ii) separate from the optical displacement device.

5. The apparatus of claim 1, wherein the optical displacement device comprises:
   a first reflective surface;
   a second reflective surface, wherein a relative motion between the first reflective surface and the second reflective surface is indicative of the parameter of interest; and
   a gap between the first reflective surface and the second reflective surface.

6. The apparatus of claim 1, wherein the beam property is one of: (i) wavelength and (ii) angle of incidence.

7. The apparatus of claim 1, wherein an absolute value of the first value of the beam property is not equal to an absolute value of the second value of the beam property.

8. The apparatus of claim 1, wherein the detector array comprises at least one of: (i) at least two detectors, (ii) a linear detector array, (iii) a Fresnel lens, and (iv) a collimating lens.

9. The apparatus of claim 1, wherein the detector array is configured to receive the electromagnetic beams at least one of: (i) simultaneously and (ii) sequentially.

10. The apparatus of claim 1, further comprising:
    a carrier configured to be conveyed in a borehole penetrating an earth formation, wherein the optical displacement device and the detector array are disposed on the carrier.

11. The apparatus of claim 1, wherein the first and second electromagnetic beams are coherent.

12. The apparatus of claim 1, wherein the parameter of interest comprises at least one of: (i) a force and (ii) an acceleration.

13. The apparatus of claim 1, wherein the optical displacement device is responsive to movement of a moveable element indicative of the parameter of interest.

14. A method for estimating a parameter of interest, comprising:
    estimating the parameter of interest using a detector array configured to receive a part of a first electromagnetic beam and a part of a second electromagnetic beam, wherein the first electromagnetic beam has a first value of a beam property and the second electromagnetic beam has a second value of the beam property, wherein the first value is different than the second value, and the electromagnetic beams converge in an optical displacement device prior to reaching the detector array.

15. The method of claim 14, further comprising:
    converging the first and second beams using a convergence device.

16. The method of claim 14, wherein the beam property is one of: (i) wavelength and (ii) angle of incidence.

17. The method of claim 14, wherein an absolute value of the beam property value of the first electromagnetic beam is not equal to an absolute value of the beam property value of the second electromagnetic beam.

18. The method of claim 14, wherein the detector array is configured to receive the electromagnetic beams at least one of: (i) simultaneously and (ii) sequentially.

19. The method of claim 14, further comprising:
    conveying the optical displacement device and the detector array in a borehole penetrating an earth formation.

20. The method of claim 14, wherein the optical displacement device comprises:
    a first reflective surface;
    a second reflective surface, wherein a relative motion between the first reflective surface and the second reflective surface is indicative of the parameter of interest; and
    a gap formed by the first reflective surface and the second reflective surface.

21. The method of claim 14, wherein the first and second electromagnetic beams are coherent.

22. The method of claim 14, wherein the parameter of interest comprises at least one of: (i) a force and (ii) an acceleration.

* * * * *